(12) United States Patent
Abdalla (10) Patent No.: US 10,894,227 B2
(45) Date of Patent: Jan. 19, 2021

(54) AUTO DRAIN PLUG FOR A FILTRATION APPARATUS

(71) Applicant: Cummins Filtration IP, Inc., Columbus, IN (US)

(72) Inventor: Wassem Abdalla, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 866 days.

(21) Appl. No.: 15/534,338

(22) PCT Filed: Dec. 10, 2015

(86) PCT No.: PCT/US2015/064898
§ 371 (c)(1),
(2) Date: Jun. 8, 2017

(87) PCT Pub. No.: WO2016/100065
PCT Pub. Date: Jun. 23, 2016

(65) Prior Publication Data
US 2017/0361250 A1    Dec. 21, 2017

Related U.S. Application Data

(60) Provisional application No. 62/093,793, filed on Dec. 18, 2014.

(51) Int. Cl.
*B01D 35/16*    (2006.01)
*B01D 35/04*    (2006.01)
(Continued)

(52) U.S. Cl.
CPC .......... *B01D 35/04* (2013.01); *B01D 35/005* (2013.01); *B01D 35/153* (2013.01); *B01D 35/16* (2013.01);
(Continued)

(58) Field of Classification Search
CPC ...... B01D 35/04; B01D 35/153; B01D 35/16; B01D 35/005; B01D 35/30; B01D 2201/4007
(Continued)

(56) References Cited

U.S. PATENT DOCUMENTS 2,856,075 A   10/1958  Kahl
3,745,753 A    7/1973  Risse
(Continued)

FOREIGN PATENT DOCUMENTS

CN    2609635 Y    4/2004
CN    101842572 A   9/2010
(Continued)

OTHER PUBLICATIONS

International Search Report and Written Opinion issued for PCT/US2015/064898, dated Apr. 11, 2016, 12 pages.

*Primary Examiner* — Thomas M Lithgow
(74) *Attorney, Agent, or Firm* — Foley & Lardner LLP (57) ABSTRACT

A filtration apparatus comprises a housing defining an internal volume sized to receive a filter element, an inlet for receiving a fluid and an outlet for expelling the fluid. A retention mechanism is disposed in the housing having a ball plug operatively connected thereto and selectively displaceable in an axial direction relative to the housing. An engagement member is disposed within the housing and comprises a port having an opening and a ramp. A portion of the port is disposed within the outlet. The ball plug is movable between a first position, in which the ball plug rests on the ramp, does not seal the opening of the port and fluid can be expelled from the housing port, and a second position in which the ball plug is aligned with the port, the ball plug seals the opening of the port and the fluid cannot be expelled from the outlet.

22 Claims, 11 Drawing Sheets

(51) Int. Cl.
   *B01D 35/153* (2006.01)
   *B01D 35/00* (2006.01)
   *B01D 35/30* (2006.01)
(52) U.S. Cl.
   CPC ...... *B01D 35/30* (2013.01); *B01D 2201/4007* (2013.01)
(58) Field of Classification Search
   USPC .......................................................... 210/248
   See application file for complete search history.

(56) References Cited

U.S. PATENT DOCUMENTS

| | | | |
|---|---|---|---|
| 3,920,553 A | 11/1975 | Cilento | |
| 3,928,007 A | 12/1975 | Jackson | |
| 4,020,783 A | 5/1977 | Anderson et al. | |
| 4,424,128 A | 1/1984 | Shinaver | |
| 4,502,954 A | 3/1985 | Druffel | |
| 4,619,764 A | 10/1986 | Church et al. | |
| 4,906,365 A | 3/1990 | Baumann et al. | |
| 5,098,559 A | 3/1992 | Mack et al. | |
| 5,468,386 A | 11/1995 | Ardes | |
| 5,520,801 A | 5/1996 | Gerber et al. | |
| 5,718,825 A | 2/1998 | Greive et al. | |
| 5,882,367 A | 3/1999 | Morgan et al. | |
| 5,888,384 A | 3/1999 | Wiederhold et al. | |
| 5,902,479 A | 5/1999 | Fukumori et al. | |
| 6,015,492 A | 1/2000 | Popoff et al. | |
| 6,053,334 A | 4/2000 | Popoff et al. | |
| 6,068,762 A | 5/2000 | Stone et al. | |
| 6,146,433 A | 11/2000 | Bitner | |
| 6,258,143 B1 | 7/2001 | Carawan et al. | |
| 6,280,493 B1 | 8/2001 | Eubank | |
| 6,308,836 B1 | 10/2001 | Guichaoua et al. | |
| 6,402,798 B1 | 6/2002 | Kallsen et al. | |
| 6,506,303 B1 | 1/2003 | Gustafsson et al. | |
| 6,543,625 B1 | 4/2003 | Le Roux et al. | |
| 6,565,746 B1 | 5/2003 | Stamey et al. | |
| 6,585,889 B2 | 7/2003 | Weingaertner | |
| 6,652,749 B2 * | 11/2003 | Stankowski | B01D 29/606 210/232 |
| 6,706,181 B1 | 3/2004 | Baumann et al. | |
| 6,709,576 B2 | 3/2004 | Jokschas | |
| 6,833,066 B2 | 12/2004 | Baumann et al. | |
| 6,835,305 B1 | 12/2004 | Baumann et al. | |
| 6,884,349 B1 | 4/2005 | Jiang | |
| 6,902,598 B2 | 6/2005 | Gunderson et al. | |
| 6,910,692 B2 | 6/2005 | Malone et al. | |
| 6,936,169 B2 | 8/2005 | Baumann et al. | |
| 6,958,083 B1 | 10/2005 | Schmitz et al. | |
| 6,972,092 B1 | 12/2005 | Roll | |
| 7,060,184 B2 | 6/2006 | Cline et al. | |
| 7,070,692 B2 | 7/2006 | Knight | |
| 7,297,255 B2 | 11/2007 | Stockbower | |
| 7,390,407 B2 | 6/2008 | Weindorf et al. | |
| 7,537,631 B2 | 5/2009 | Scott et al. | |
| 7,572,306 B2 | 8/2009 | Hawkins et al. | |
| 7,585,345 B2 | 9/2009 | Smasal et al. | |
| 7,740,678 B2 | 6/2010 | Gunderson et al. | |
| 7,833,305 B1 | 11/2010 | Studer | |
| 7,871,517 B2 | 1/2011 | Komine et al. | |
| 7,887,701 B2 | 2/2011 | Schmid et al. | |
| 7,998,251 B2 | 8/2011 | Pondelick et al. | |
| 8,099,999 B2 | 1/2012 | Nakano | |
| 8,168,066 B2 | 5/2012 | Wieczorek et al. | |
| 8,375,925 B2 | 2/2013 | Ichikawa et al. | |
| 8,726,876 B2 | 5/2014 | Kobayashi et al. | |
| 8,784,523 B2 | 7/2014 | Coulonvaux et al. | |
| 8,821,734 B2 | 9/2014 | Grass et al. | |
| 8,828,114 B2 | 9/2014 | Dhiman et al. | |
| 8,845,897 B2 | 9/2014 | Wieczorek et al. | |
| 9,562,449 B2 | 2/2017 | Gao et al. | |
| 9,718,010 B2 | 8/2017 | Byun et al. | |
| 2002/0100720 A1 | 8/2002 | Jainek | |
| 2002/0108897 A1 | 8/2002 | Pavlin et al. | |
| 2003/0127384 A1 | 7/2003 | Kapur | |
| 2004/0093859 A1 | 5/2004 | Schmeichel et al. | |
| 2004/0206682 A1 | 10/2004 | Hamlin et al. | |
| 2004/0244784 A1 | 12/2004 | Michel | |
| 2005/0193695 A1 | 9/2005 | Holmes et al. | |
| 2005/0279958 A1 | 12/2005 | Baumann | |
| 2006/0118475 A1 | 6/2006 | Girondi | |
| 2006/0118476 A1 | 6/2006 | Weindorf et al. | |
| 2006/0207948 A1 | 9/2006 | Hacker et al. | |
| 2007/0215561 A1 | 9/2007 | Yates et al. | |
| 2008/0190082 A1 | 8/2008 | Scott et al. | |
| 2008/0289305 A1 | 11/2008 | Girondi | |
| 2009/0065447 A1 | 3/2009 | Forrest et al. | |
| 2010/0122952 A1 | 5/2010 | South et al. | |
| 2010/0146917 A1 | 6/2010 | Coulonvaux et al. | |
| 2010/0326392 A1 * | 12/2010 | Grass | B01D 29/52 123/196 A |
| 2011/0073538 A1 | 3/2011 | Jiang et al. | |
| 2011/0089091 A1 * | 4/2011 | Grass | B01D 35/153 210/90 |
| 2011/0308212 A1 | 12/2011 | Ruhland et al. | |
| 2011/0315126 A1 | 12/2011 | Yoshida et al. | |
| 2012/0067014 A1 | 3/2012 | Dhiman et al. | |
| 2012/0234743 A1 * | 9/2012 | Braunheim | B01D 35/153 210/232 |
| 2013/0025557 A1 | 1/2013 | Chlystek et al. | |
| 2013/0043176 A1 | 2/2013 | Johnson et al. | |
| 2013/0213235 A1 | 8/2013 | Da Silva et al. | |
| 2014/0124459 A1 * | 5/2014 | Li | B01D 35/1573 210/767 |
| 2016/0177890 A1 | 6/2016 | Kobayashi et al. | |
| 2017/0028324 A1 | 2/2017 | Komiyama et al. | |
| 2017/0368487 A1 | 12/2017 | Bannister et al. | |

FOREIGN PATENT DOCUMENTS

| | | |
|---|---|---|
| CN | 102958581 A | 3/2013 |
| DE | 35 38 589 A1 | 5/1987 |
| DE | 19646350 C2 | 7/2000 |
| DE | 19524417 C2 | 4/2001 |
| DE | 10064482 A1 | 7/2002 |
| DE | 44 44 934 B4 | 5/2004 |
| DE | 69726690 T2 | 10/2004 |
| DE | 19650185 B4 | 11/2007 |
| DE | 60317288 T2 | 8/2008 |
| EP | 0 781 586 A2 | 12/1996 |
| EP | 1 256 707 A2 | 11/2002 |
| EP | 1 616 611 A1 | 1/2006 |
| EP | 1 974 786 A1 | 10/2008 |
| EP | 2 263 772 A1 | 12/2010 |
| EP | 2 336 510 A1 | 6/2011 |
| EP | 3 034 823 A1 | 6/2016 |
| JP | 09-010515 A | 1/1997 |
| JP | 2004-167295 A | 6/2004 |
| KR | 10-2005-0032337 A | 4/2005 |
| KR | 10-2006-0069636 A | 6/2006 |
| WO | WO-02/20132 A2 | 3/2002 |
| WO | WO-2004/069373 A1 | 8/2004 |
| WO | WO-2007/043669 A1 | 4/2007 |
| WO | WO-2010/040594 A1 | 4/2010 |
| WO | WO-2017/108483 A1 | 6/2017 |

* cited by examiner

FIG. 11

AUTO DRAIN PLUG FOR A FILTRATION APPARATUS

CROSS-REFERENCE TO RELATED APPLICATIONS

The present application is a National Stage of PCT Application No. PCT/US2015/064898, filed Dec. 10, 2015, which claims priority to and benefit of U.S. Provisional Patent Application No. 62/093,793, filed Dec. 18, 2014 and entitled "Auto Drain Plug for a Filtration Apparatus." The contents of both applications are herein incorporated by reference in their entirety.

TECHNICAL FIELD

The present disclosure related generally to a filtration apparatus for filtering liquid fluids.

BACKGROUND

Internal combustion (IC) engines use the energy produced by the combustion of fuels (e.g., diesel, gasoline, ethanol, natural gas, etc.) to perform mechanical work. Most fuels used by IC engines, for example, diesel, gasoline and ethanol, are in the liquid state when communicated to the IC engines. Such fuels are typically filtered to remove contaminants such as, particulates, debris, dust, etc. before insertion into a combustion chamber of the IC engine.

To prevent or reduce the amount of contaminants being communicated to the IC engine, a filter is generally disposed upstream of the IC engine and fluidically coupled to the IC engine. The filter includes a filter element (e.g., a filter media) which traps the contaminants as the fuel passes through the filter such that fuel which is substantially free from contaminants is inserted into the combustion chamber. The level of restriction with in the filter element increases significantly after repeated use and is therefore serviced or replaced on a periodic basis.

The dirty or contaminated fuel present within the filter should be drained, for example, back to a fuel tank, before uncoupling the filter from the IC engine otherwise the fuel can spill out of a housing of the filter. Furthermore, the dirty or otherwise contaminated fuel present on a dirty side of the filter should be drained before the fuel in a clean side of the filter is drained to prevent contaminated fuel from being transferred to a clean side of the filter. If the contaminated fuel enters the clean side of the filter, the contaminated fuel can be inserted into the IC engine when the filter is fluidically coupled to the IC engine after maintenance.

SUMMARY

Embodiments described herein relate generally to a filtration apparatus for filtering fuels, and in particular to a filtration apparatus that includes a ball plug to allow draining of contaminated fuel from the filtration apparatus on demand.

In a first set of embodiments, a filtration apparatus comprises a housing defining an internal volume sized to receive a filter element. The housing comprises an inlet for receiving a fluid and an outlet for expelling the fluid. A retention mechanism is disposed in the housing. A ball plug is operatively connected to the retention mechanism and is configured to be selectively displaced in an axial direction relative to the housing. An engagement member is disposed within the housing. The engagement member comprises a port having an opening and a ramp. At least a portion of the port is disposed within the outlet of the housing. The ball plug is movable between a first position and a second position. In the first position, the ball plug rests on the ramp and does not seal the opening of the port such that the fluid can be expelled from the outlet of the housing. In the second position, the port is aligned with the ball plug and the ball plug seals the opening of the port such that the fluid cannot be expelled from the outlet of the housing.

In particular embodiments, the retention mechanism comprises a cage defining an internal volume within which the ball plug is disposed. The cage has at least one sidewall and a roof. An end of the at least one sidewall is proximal to the engagement member, thereby defining a retention feature structured to retain the ball plug within the internal volume. In the first position, a first portion of the ball plug is distal from the roof and a second portion of the ball plug is in contact with the ramp of the engagement member such that the opening of the port is not sealed. In the second position, the ball plug is aligned with the port, the first portion of the ball plug is in contact with the roof, and the second portion of the ball plug is in contact with the port and seals the opening of the port.

In another set of embodiments, an apparatus for allowing selective removal of fluid from a housing which is sized to receive a filter element, and includes an inlet for receiving a fluid and an outlet for expelling the fluid, comprises a cage defining an internal volume. The cage having at least one sidewall and a roof. An end of the at least one sidewall opposite the roof defines a protrusion. A ball plug is positioned within the internal volume of the cage and retained therein by the protrusion. The ball plug is configured to be selectively displaced in an axial direction relative to the housing. An engagement member is disposed within the housing. The engagement member comprises a port having an opening and a ramp. At least a portion of the port is disposed within the outlet of the housing. The ball plug is movable between a first position and a second position. In the first position, the ball plug rests on the ramp and the ball plug does not seal the opening of the port such that the fluid can be expelled from the outlet of the housing. In the second position, the ball plug is aligned with the port and the ball plug seals the opening of the port such that the fluid cannot be expelled from the outlet of the housing.

In yet another set of embodiments, an apparatus for allowing selective removal of fluid from a housing which is sized to receive a filter element, and includes an inlet for receiving a fluid and an outlet for expelling the fluid, comprises a retention mechanism positioned in the housing. The retention mechanism comprises a base having a circular protrusion positioned thereon and a retention ring is slidably disposed on the base. A ball plug coupled to the retention ring. The ball plug is structured to be selectively displaced in an axial direction relative to the housing. An engagement member is positioned within the housing. The engagement member comprises a port having an opening and a ramp. At least a portion of the port is positioned within the outlet of the housing. The ball plug is movable between a first position and a second position. In the first position, the ball plug rests on the ramp and the ball plug does not seal the opening of the port such that the fluid can be expelled from the outlet of the housing. In the second position the ball plug is aligned with the port and the ball plug seals the opening of the port such that the fluid cannot be expelled from the outlet of the housing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a filtration apparatus for filtering liquid fuels, and in particular to a filtration apparatus that includes ball plug to allow draining of contaminated fuel from the filtration apparatus on demand.

Embodiments described herein may provide benefits including, for example: (1) providing a pluggable outlet for draining contaminated fuel from a fuel filter before fluidically uncoupling the fuel filter from an IC engine; (2) allowing earlier start draining by utilizing facial seal rather than radial seal where the seal will break once the filter starts to be displaced axial for service; (3) providing a ball plug that can be moved between a first position to allow fuel to drain from the outlet and a second position to plug the outlet without requiring any alignment or orientation; and (4) providing an apparatus that is compatible with conventional filtration apparatus with minor modifications.

Figure 1:
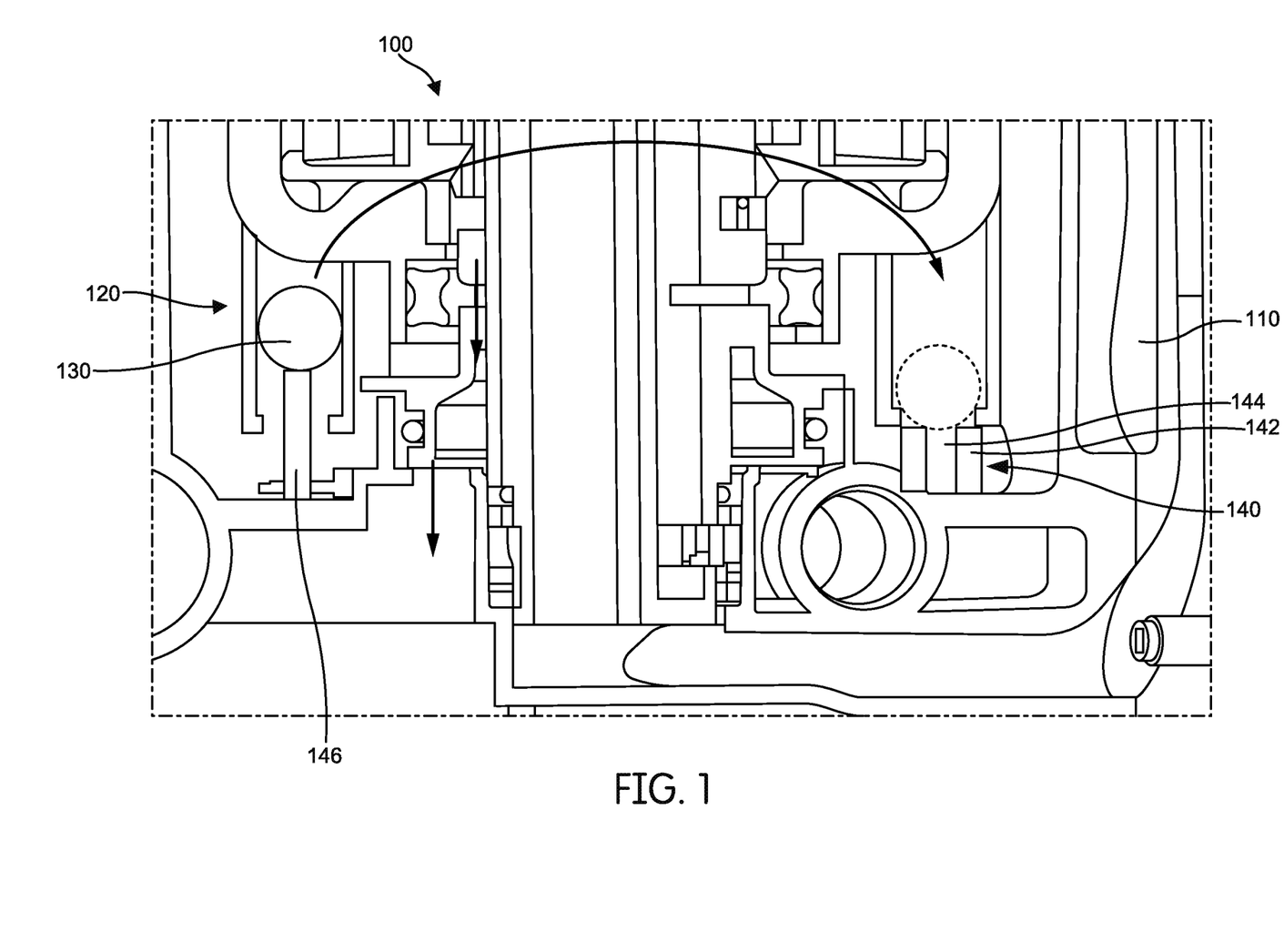
FIG. 1 is an illustration of a side cross-section of a filtration apparatus that includes a retention mechanism, a ball plug, and an engagement member, according to an embodiment.

FIG. 1 is a side cross-section of a filtration apparatus 100 for filtering liquid fuels. The filtration apparatus includes a housing 110, a retention mechanism 210, a ball plug 130, and an engagement member 140. The filtration apparatus 100 can be moved between a first configuration and a second configuration to expel a fluid (e.g., contaminated fuel) from the filtration apparatus 100 before fluidically uncoupling the filtration apparatus 100 from an IC engine.

The housing 110 can be made from a strong and rigid material such as, for example, high density polypropylene (HDPP). The housing defines an internal volume sized to receive a filter element. Any suitable filter element comprising a variety of different filter media can be used in the housing 110. The filter element can have any suitable pore size, for example, about 10 microns, about 5 microns, or about 1 micron.

The housing 110 includes an inlet (not shown) for receiving a fluid (e.g., diesel fuel, gasoline, ethanol, etc.), for example from a fluid tank. The fluid received from the fluid tank can be contaminated with contaminants such as particulates, debris, dust etc. The fluid can pass through the filter element disposed within the housing 110 which removes contaminants from the fluid. The clean fluid can then be communicated to the IC engine. The housing 110 also includes and an outlet (not shown) for expelling the fluid (e.g., contaminated diesel fuel) which remains within the internal volume of the housing 110.

The retention mechanism 120 is disposed in the housing 110. The ball plug 130 is coupled to the retention mechanism 120 and configured to be selectively displaced in an axial direction relative to the housing 110. In one embodiment, the retention mechanism 120 can include a cage within which the ball plug 130 is disposed. The cage can include at least one sidewall and a roof. An end of at least one sidewall of the cage proximal to the engagement member 140 can define a retention feature structured to retain the ball plug within the internal volume of the cage.

In other embodiments, the retention mechanism 120 can include a base having a circular protrusion disposed thereon. A retention ring is slidably disposed on the base. In such embodiments, the ball plug 130 can be fixedly coupled to the retention ring. The retention mechanism can also include a biasing member which can be coupled to the ring and configured to bias the ring towards the engagement member 140.

In particular embodiments, the retention mechanism 120 can be coupled to a filter disposed within the housing 110. In such embodiments, the retention mechanism 120 can rotate with the filter, for example, when the filter is rotated relative the housing 110 (e.g., to couple the filter to the housing 110). In other embodiments, the retention mechanism 120 can be fixedly disposed in the housing 110. In such embodiments, the ball plug 130 can move about the filter, for example, within a cage of the retention mechanism or with a retention ring of the retention mechanism, as described herein.

The engagement member 140 is also disposed within the housing 110. The engagement member 140 comprises a port 142 having an opening 144. At least a portion of the port 142 is disposed within the outlet of the housing 110. In this manner, the engagement member 140 provides a flow path for the fluid (e.g., contaminated diesel fuel) disposed in the housing 110 to be drained through the outlet via the port 142. The engagement member 140 also includes a ramp 146. In a particular embodiment, the engagement member 140 is generally a circular ring shaped member and is structured to be fixed relative to the housing 110.

The ball plug 130 is formed from a corrosion resistant and inert material which can withstand the fluid (e.g., diesel fuel). Furthermore, the ball plug 130 is capable of forming a fluid tight seal with the opening 144 of the port 142 to prevent the fluid from being expelled from the housing 110 through outlet via the port 142. For example, the ball plug 130 can be formed from rubber, silicone, polymers and/or any other suitable material (including combinations thereof). In some embodiments, the ball plug 130 can also allow for small amount of liquid drainage during operation so it can allow for separated water by the filter element to be drained continuously back to a fuel tank.

The engagement member 140 also includes a ramp 146. In a particular embodiment, the engagement member 140 is generally a circular ring shaped member and is structured to be fixed relative to the housing 110. The ball plug 130 is movable between a first position and a second position as shown by the arrow B. In the first position, the ball plug 130 rests on the ramp 146 and does not seal the opening 144 of the port 142 such that the fluid (e.g., diesel, gasoline, ethanol, etc.) can be expelled from outlet via the port 142. In the second position, the ball plug 130 can be aligned with the port 142 and the ball plug 130 seals the opening 144 of the port 142 such that the fluid cannot be expelled from the outlet of the housing 110.

In one embodiment, the movement of the ball plug 130 between the first and second positions is due to rotation of the filter to which the retention mechanism 120 is coupled. The ball plug 130 can move with the retention mechanism 120 or relative to the retention mechanism 120 until the ball plug 130 is aligned with the port 142. In another embodiment, the ball plug 130 rides the ramp 146 of the engagement member 140 and moves freely over the ramp 146 (e.g., revolves about the filter) due to fuel flow, friction, or gravity. For example, the ramp 146 can be inclined at an angle which urges the ball plug 130 towards the port 142. The ball plug 130 moves over the ramp 146 until the ball plug 130 reaches the port 142 and seats on the opening 144 of the port 142 to seal the opening 144.

Expanding further, in particular embodiments, the fluid can include a fuel (e.g., diesel fuel). At least a portion of the internal volume of the housing 110 which is in fluid communication with the opening 144 can contain contaminated fuel, as described herein. In the second configuration, the filtration apparatus 100 can be coupled to the engine and the ball plug seals the opening 144 of the port 142 of the engagement member 140. Therefore, the contaminated fuel is retained within the filtration apparatus 100.

Before fluidically uncoupling the filtration apparatus 100 from the engine (e.g., to service the filter element of the filtration apparatus 100), the contaminated fuel should be drained to prevent any contaminated fuel from entering the engine from the filtration apparatus 100. To achieve this, the ball plug 130 is moved into the first position such that the ball plug 130 rides the ramp 146 of the engagement member 140 and does not seal the opening 144 allowing the contaminated fuel to be drained from the housing 110 via the port 142. The contaminated fuel can be drained under the influence of gravity.

FIGS. 2-6 are cross-sectional views of a filtration apparatus 200 in various configurations. The filtration apparatus 200 includes a housing 210, a retention mechanism 220, a ball plug 230 and an engagement member 240.

Figure 2:
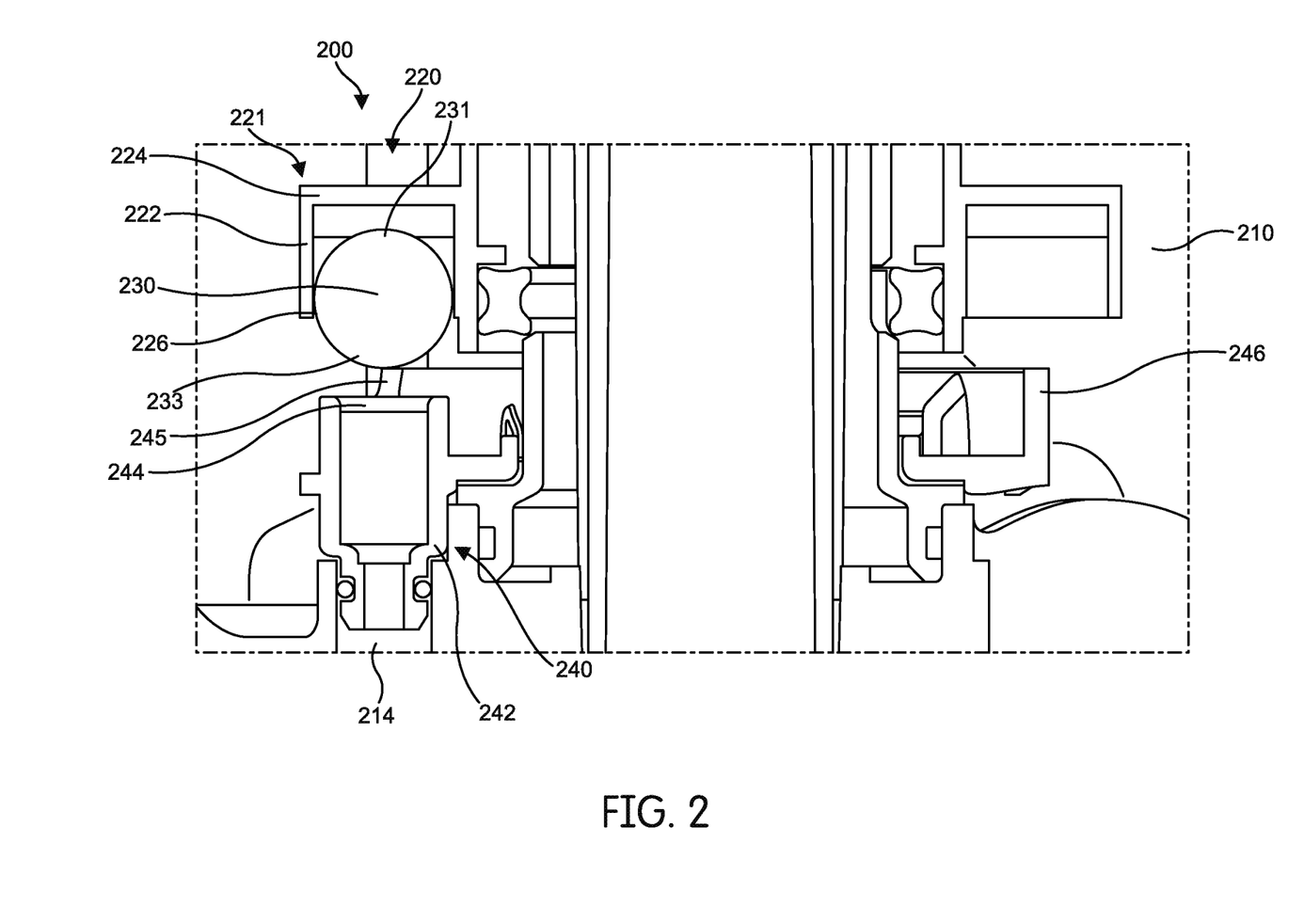
FIG. 2 is a side cross-section view of another embodiment of a filtration apparatus that includes a ball plug, a retention mechanism, and an engagement member.

The housing 210 defines an internal volume sized to receive a filter element. The housing 210 comprises an inlet (not shown) for receiving a fluid (e.g., diesel fuel) and an outlet 214 for expelling the fluid. The housing 210 can be substantially similar to the housing 110 of FIG. 1.

The retention mechanism 220 is disposed in the internal volume defined by the housing 210. The retention mechanism 220 includes a cage 221 defining an internal volume within which the ball plug 230 is disposed. The cage 221 includes a plurality of sidewalls 222 and a roof or upper surface 224. An end of the sidewalls 222 proximal to the engagement member 240 defines retention features 226. The retention feature 226 can include a notch or a protrusion structured to retain the ball plug 230 within the internal volume of the cage 221.

The ball plug 230 is coupled to the retention mechanism 220 i.e. disposed within the internal volume defined by the cage 221. The ball plug 230 is configured to be selectively displaced in an axial direction relative to the cage 221 and the thereby the housing 210. Furthermore, the ball plug 230 can be moved within the internal volume of the cage 221. The ball plug 230 includes a first portion 231 proximal to the roof 224, and a second portion 244 proximal to the engagement member 240. The ball plug 230 can be substantially similar to the ball plug 130 and is therefore not described in further detail herein.

The engagement member 240 includes a circular member disposed within the housing 210 of the filtration apparatus 200. The engagement member 240 comprises a port 242 which defines an opening 244. The engagement member 240 also includes a ramp 246. The ramp 246 includes a circular ring shaped member which is disposed about a periphery of the engagement member 240. The ramp 246 is elevated with respect to the outlet 244 of the port 242. A portion of the ramp 246 proximal to the port 242 defines a chamfer 245 structured to prevent movement of the ball plug 230 relative to the port 242 and maintain the ball plug 230 proximal to the port 242. Furthermore, the chamber 245 can be structured to guide the ball plug 230 into the port as the ball plug 230 moves over the ramp 246, as described herein.

As described herein, the ball plug 230 can be selectively displaced in an axial direction relative to the cage 221 and therefore the housing 210. Furthermore, the ball plug 230 can also move radially within the cage 221, for example on the ramp 246 of the engagement member 240. The selective displacement can move the ball plug 230 either proximally or distally relative to the roof 224 of the cage 221. The ball plug 230 can move proximally relative to the roof 226 until the first portion 231 contacts the roof 224 which prevents further displacement of the ball plug 230. Alternatively, the ball plug 230 can move distally relative to the roof 226 until the retention features 226 engage the ball plug 230 and prevent the ball plug 230 from escaping the internal volume of the cage 221, thereby retaining the ball plug 230 within the cage 221. The radial distal movement of the ball plug 230 relative to the roof 224 can be due to gravity, rotation of the filtration apparatus 200, inclination of the ramp 264 and/or fluid flow to the outlet 214 of the housing 210.

The ball plug 230 is movable between a first position and a second position. FIG. 2 shows the filtration apparatus 200 such that the ball plug 230 is aligned with the port 242. However, a distance between the retention mechanism 220 and the engagement member 240 is such that the ball plug 230 is suspended over the port 242 via the retention features 226 which retain the ball plug 230 within the cage 221. Thus the ball plug 230 does not seal the opening 244 of the port 242 thereby, allowing the fluid to be drained from the housing 210.

Figure 3:
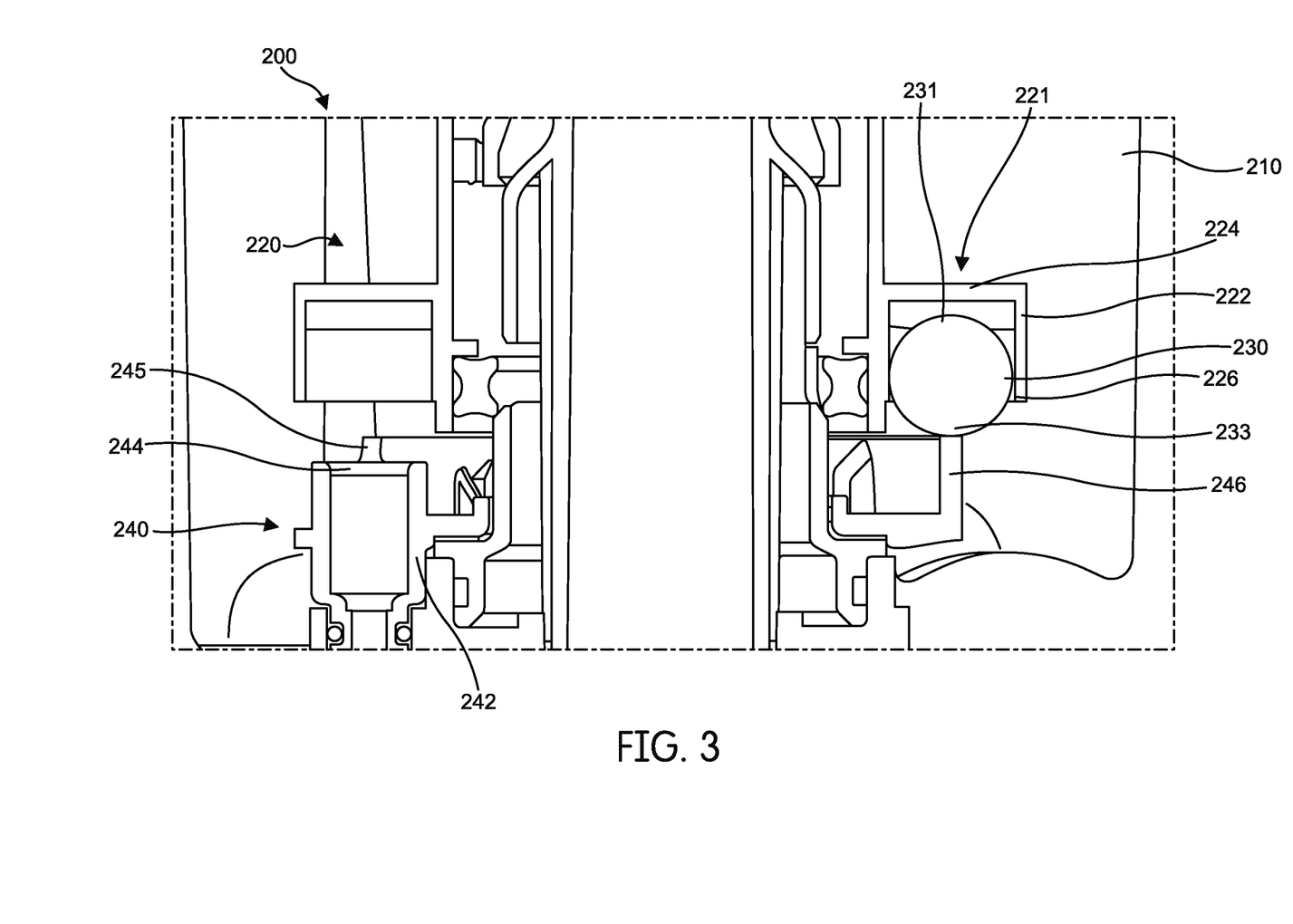
FIG. 3 is a side cross-section view of the filtration apparatus of FIG. 3 in a first configuration, after half a rotation of the engagement member.

FIG. 3 shows the filtration apparatus 200 after a half turn rotation i.e., 180 degrees of rotation of the filter included in the filtration apparatus. The retention mechanism 220 can be coupled to the filter and rotate with the filter such that the ball plug 230 rides the ramp 246 of the engagement member and moves into the first position. In the first position, the first portion 231 of the ball plug 230 is distal from the roof 226 and the second portion 233 of the ball plug is in contact with the ramp 246. In other words, the ball plug 230 sits on the ramp 246 such that the opening 244 of the port 242 is not sealed. In the first position, the fluid (e.g., contaminated diesel fuel) can be expelled from the housing 210 through the outlet 214 via the port 242, in the first configuration.

Figure 4:
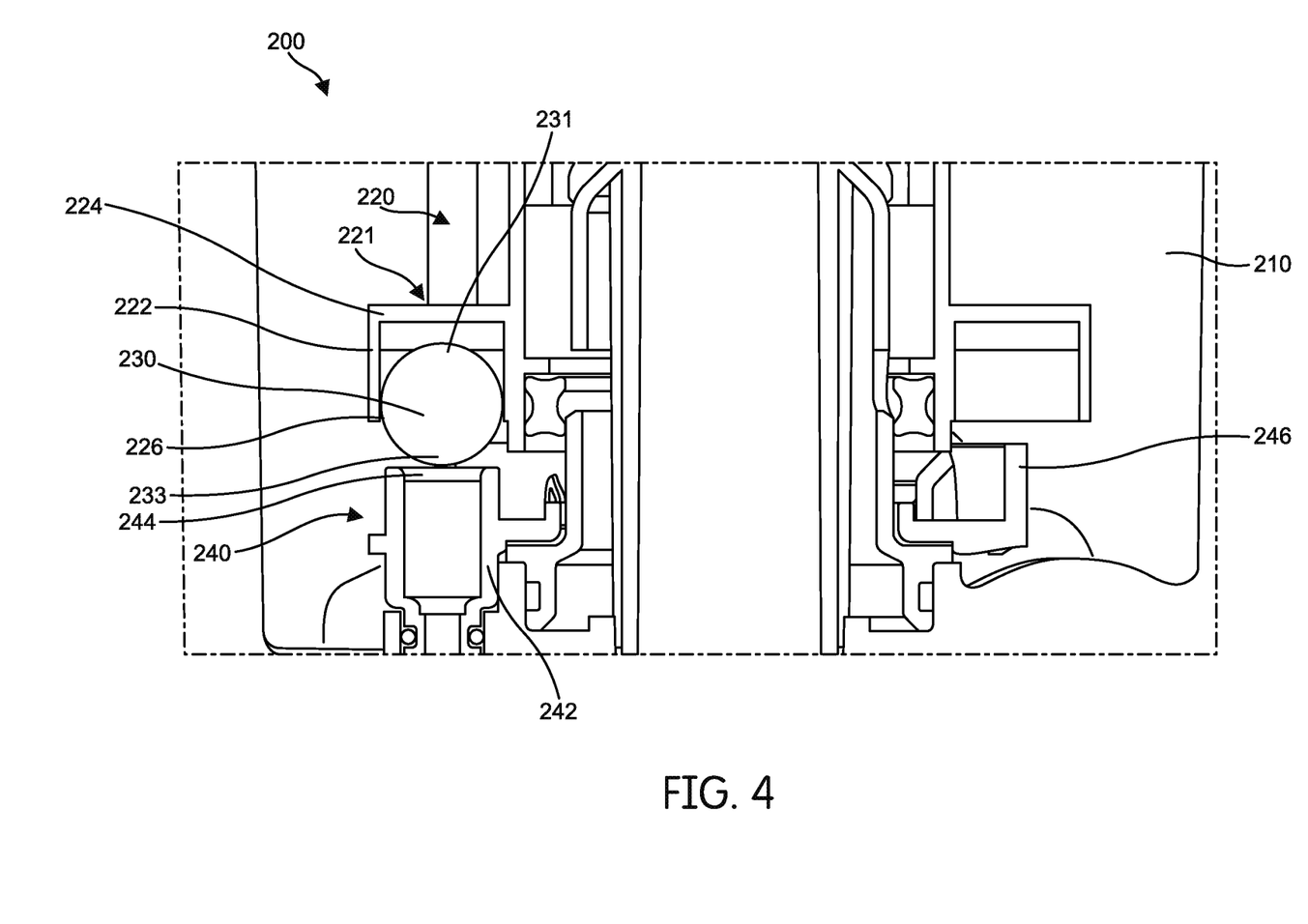
FIG. 4 is a side cross-section view of the filtration apparatus of FIG. 3, after one full rotation of the engagement member.

FIG. 4 shows the filtration apparatus 200 after a full turn rotation of the filter relative to the housing 210. The rotation of the filter urges the ball plug 230 to ride the ramp 246 such that the first portion 231 of the ball plug 230 moves proximal to the roof 224 but does not contact the roof 224. The ball plug 230 is aligned with the port 240. However, the second portion 233 is still distal from the opening 244 of the port 242 and retained by the retention features 226 within the internal volume of the cage 221. Thus the ball plug 230 is suspended over the port 242 and does not seal the opening 244 of the port 240.

Figure 5:
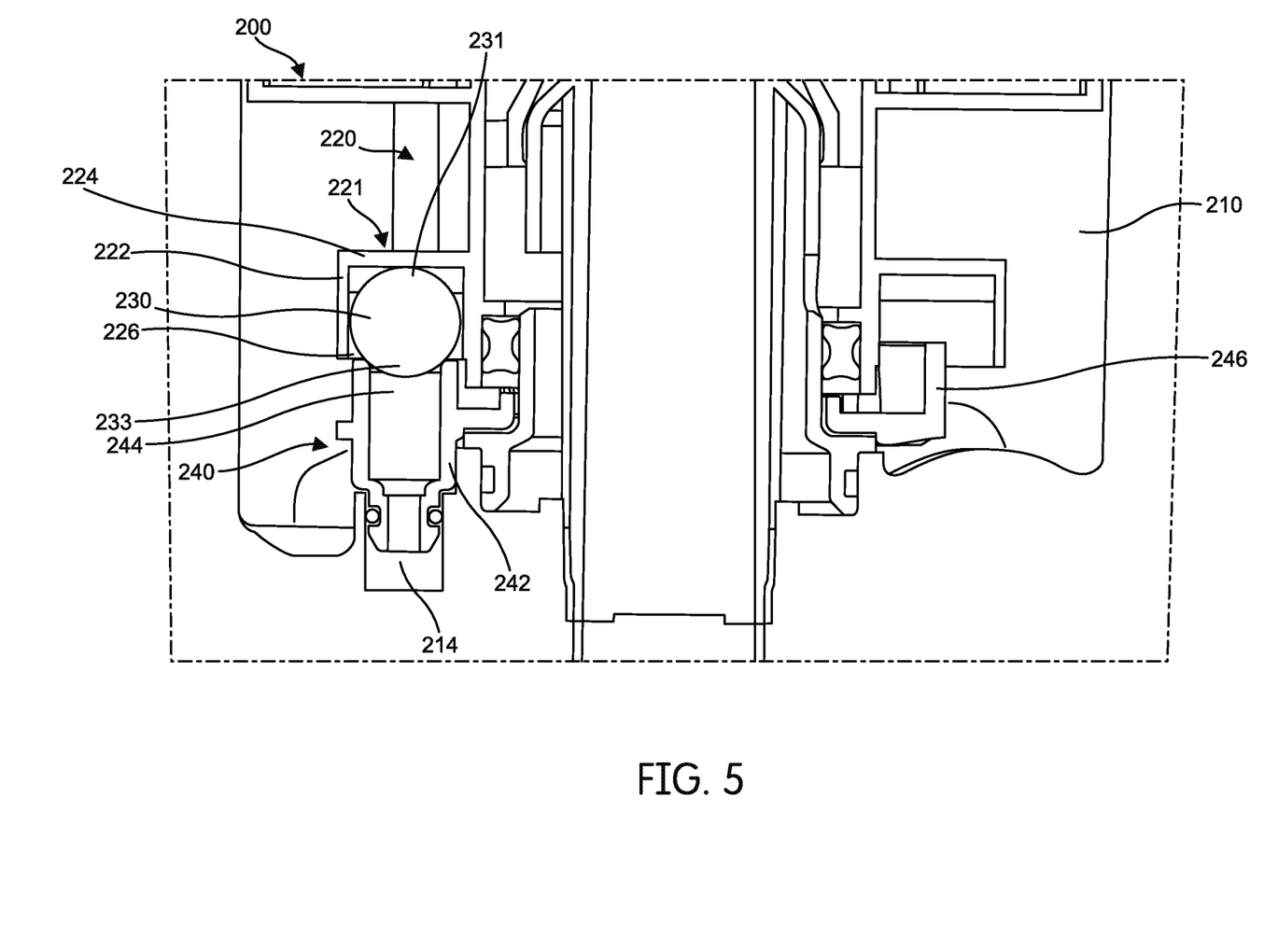
FIG. 5 is a side cross-section view the filtration apparatus of FIG. 3 in a second configuration.
Figure 6:
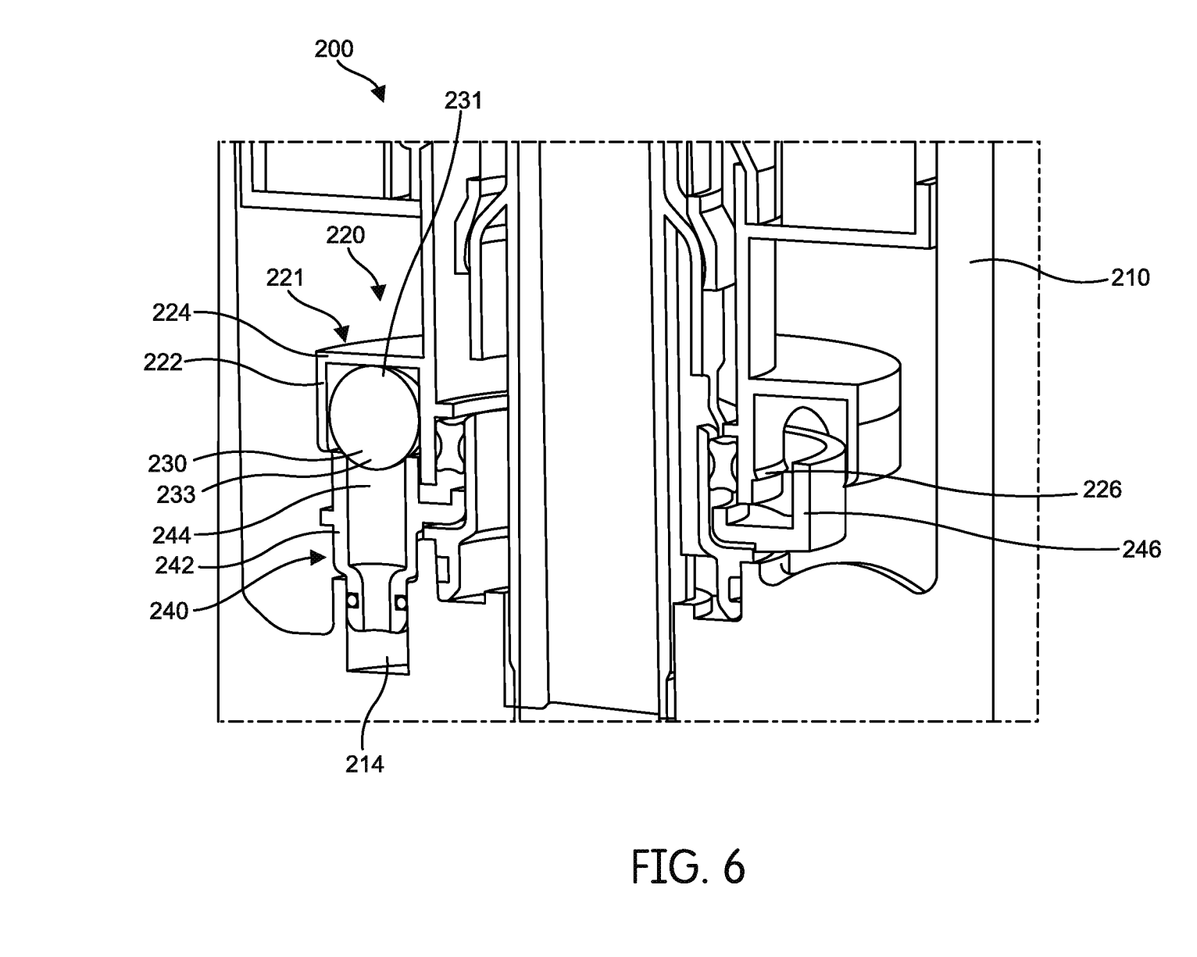
FIG. 6 is another side cross-section view of the filtration apparatus of FIG. 3 in the second configuration.

The filter can be rotated or otherwise moved axially proximal to the engagement member 240 to urge the ball plug 230 into the second position. FIGS. 5 and 6 show the ball plug 230 in the second position. The filter can be rotated further, for example, 2 turns, 3 turns, etc., to urge the ball plug into the second position. The ball plug 230 can move over the ramp 246 until the ball plug reaches the chamfer 245 of the ramp 246. The chamfer 245 urges the ball plug 230 towards the opening 244 of the port 242 and prevents the ball plug 230 from moving away from the opening 244 as long as the ball plug 230 is not being engaged by the retention features 226. In this manner, the chamfer 245 maintains the ball plug 230 proximal to the port 242.

In the second position, as shown in FIGS. 5 and 6, the ball plug 230 is aligned with the port 240. The first portion 231 of the ball plug 230 is in contact with the roof 226 and the second portion 233 of the ball is in contact with the opening 244 of the port 242 and seals the port 242. Therefore, the fluid is retained within the internal volume defined by the housing 210 in the second configuration. The roof 226 of the cage 221 prevents any further axial movement of the ball plug 230 in the second configuration and urges the ball towards the opening 244, thereby sealing the opening 244 of the port 242. The opening 244 of the port 242 is chamfered to facilitate sealing of the opening 244 by the ball plug 230.

Figure 7:
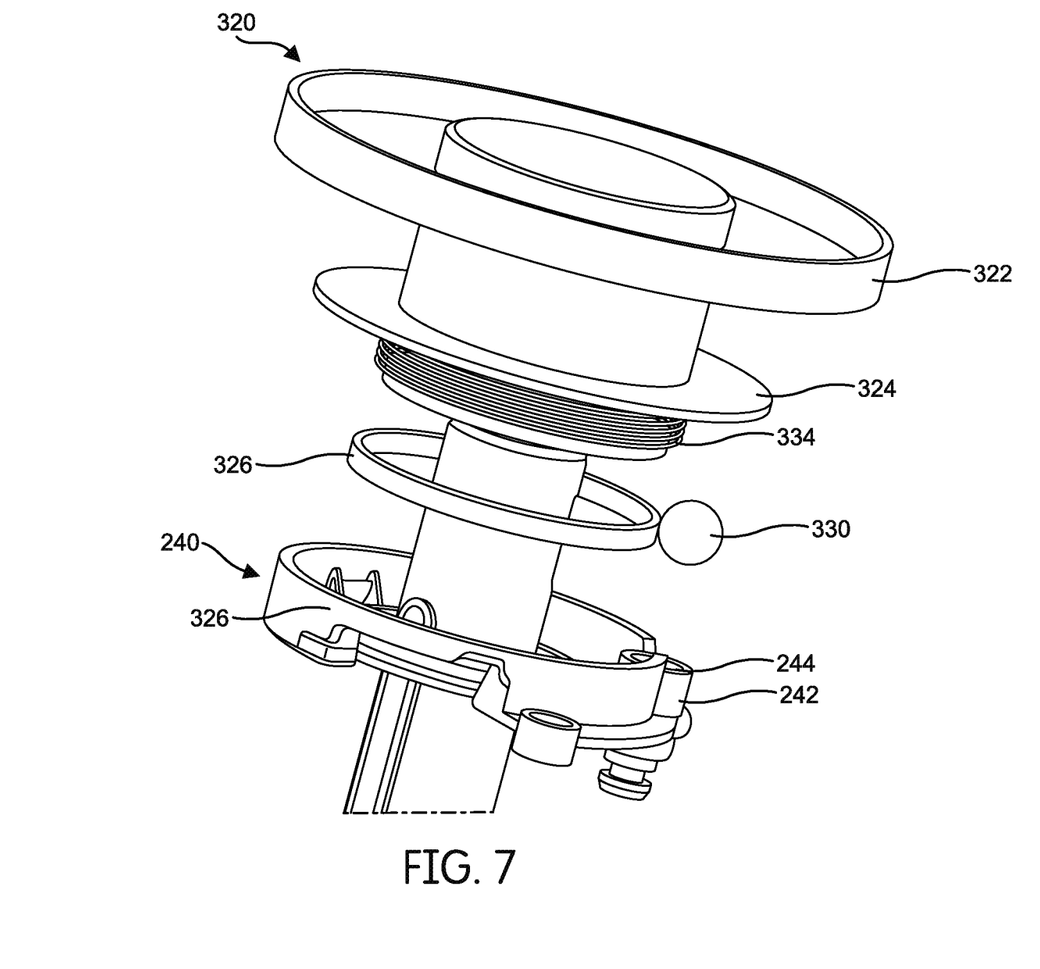
FIG. 7 is a perspective view of a retention mechanism that can be included in a filtration apparatus, according to yet another embodiment.
Figure 8:
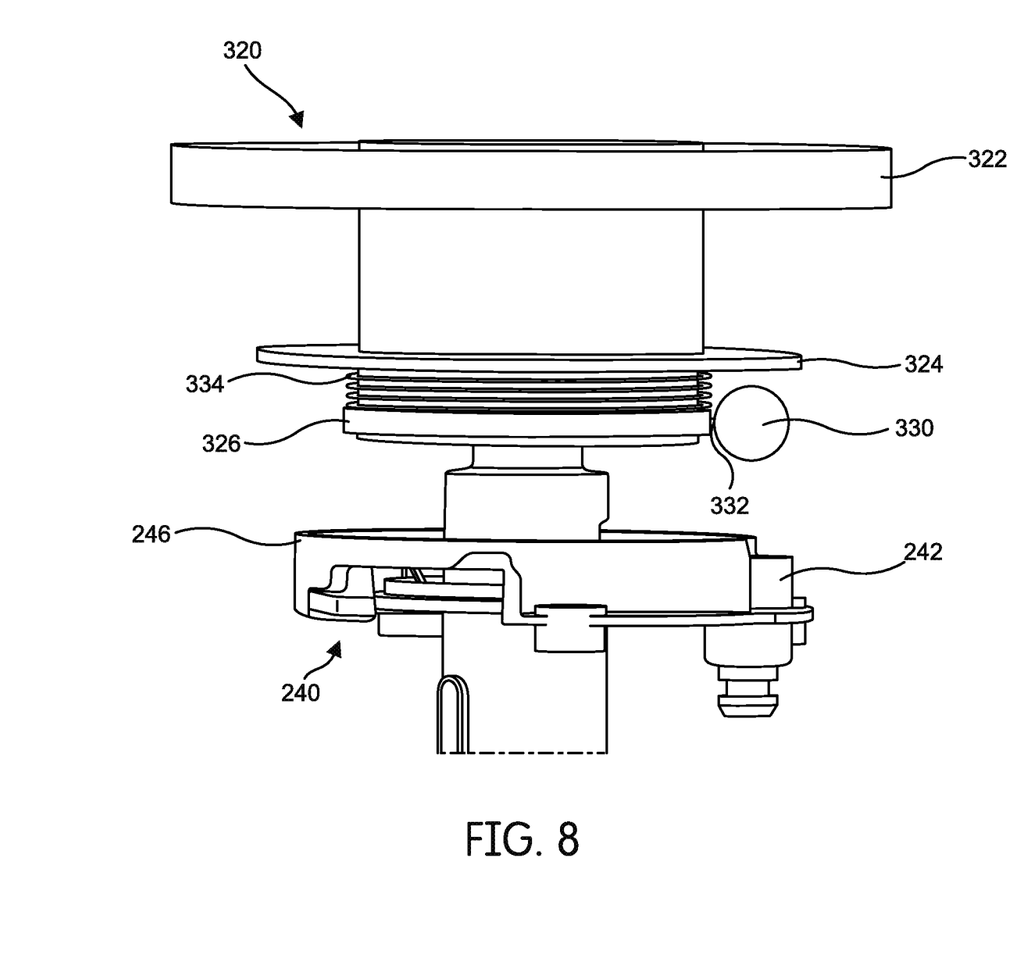
FIG. 8 is a side view of the portion of the retention mechanism of FIG. 8.

FIGS. 7 and 8 show a retention mechanism 320 that can be included in a filtration apparatus, for example, the filtration apparatus 100, 300 or any other filtration apparatus described herein which includes the engagement member 240. The retention mechanism 320 includes a base 322, a retention ring 326, a ball plug 330 and a biasing member 334.

The base 322 includes a circular member and has a circular protrusion 324 disposed thereon. The biasing member 334 is disposed on the base 322. The biasing member 334 can include a spring (e.g., a helical spring, a leaf spring, a Belleville spring, etc.) any other suitable biasing member or a combination thereof).

Figure 9:
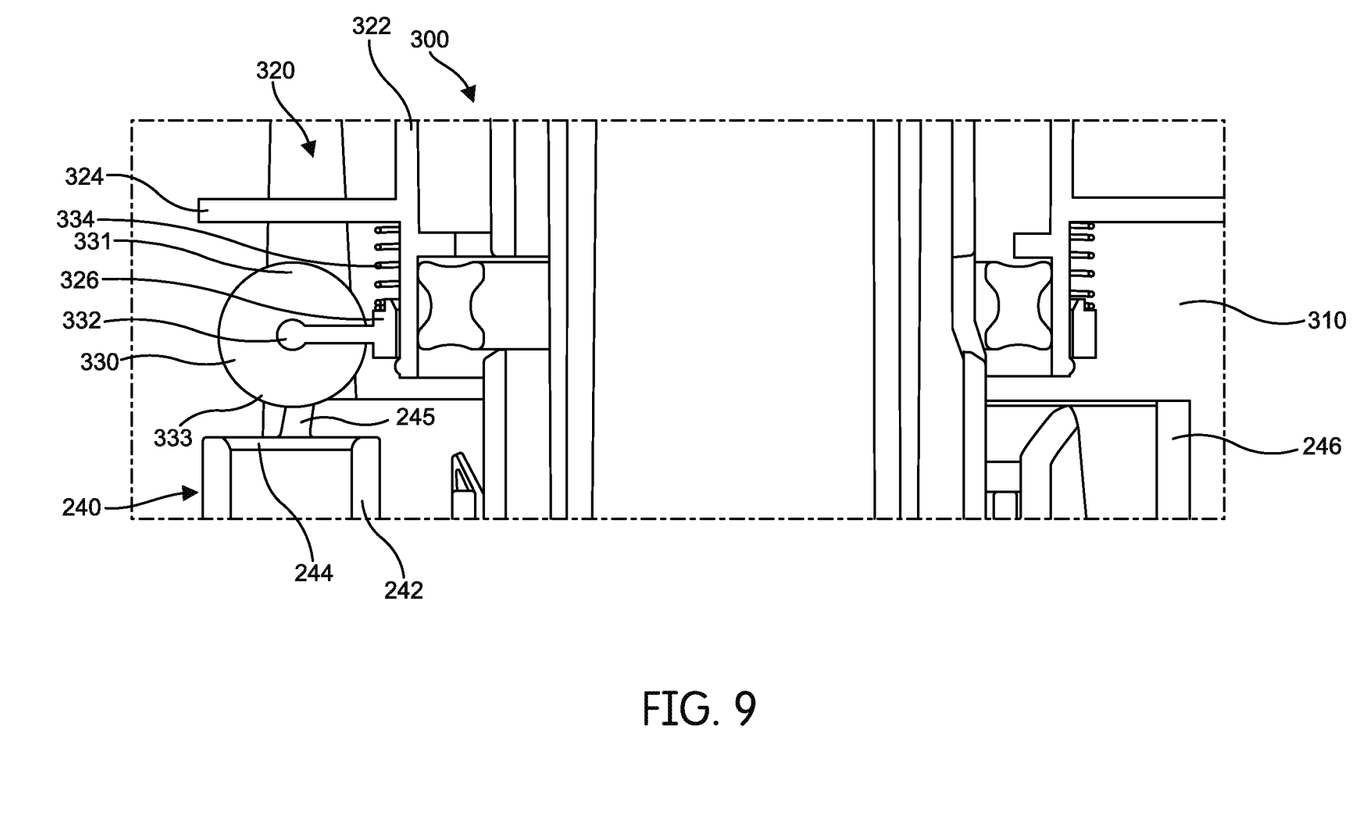
FIG. 9 is a side cross-section of a filtration apparatus that includes the retention mechanism of FIG. 8.

The retention ring 326 is slidably disposed on the base 322 and configured to be selectively displaced in an axial direction relative to the protrusion 324 of the base 322. The ball plug 330 is fixedly coupled to the retention ring 326. As shown in FIG. 9, the ball plug 330 is mounted on a rod 332 which is radially disposed on the retention ring 326. Since the ball plug 330 is fixedly coupled to the retention ring 326, axial movement of the retention ring 326 relative to the protrusion 324 also moves the ball plug 330 axially relative to the protrusion 324. In particular embodiments, the retention ring 326 can be rotatable relative to the base 322 such that the ball plug 330 is also rotatable relative to the base 322 with the retention ring 326. The biasing member 334 is coupled to the retention ring 326 and configured to urge the retention ring 326 and thereby, the ball plug 330 away from the protrusion 324. In one embodiment, the biasing member 334 can be excluded such that the retention ring 324 is urged towards the engagement member 240 due to gravity, fuel flow, or rotation of a filter included in the filtration apparatus.

Figure 10:
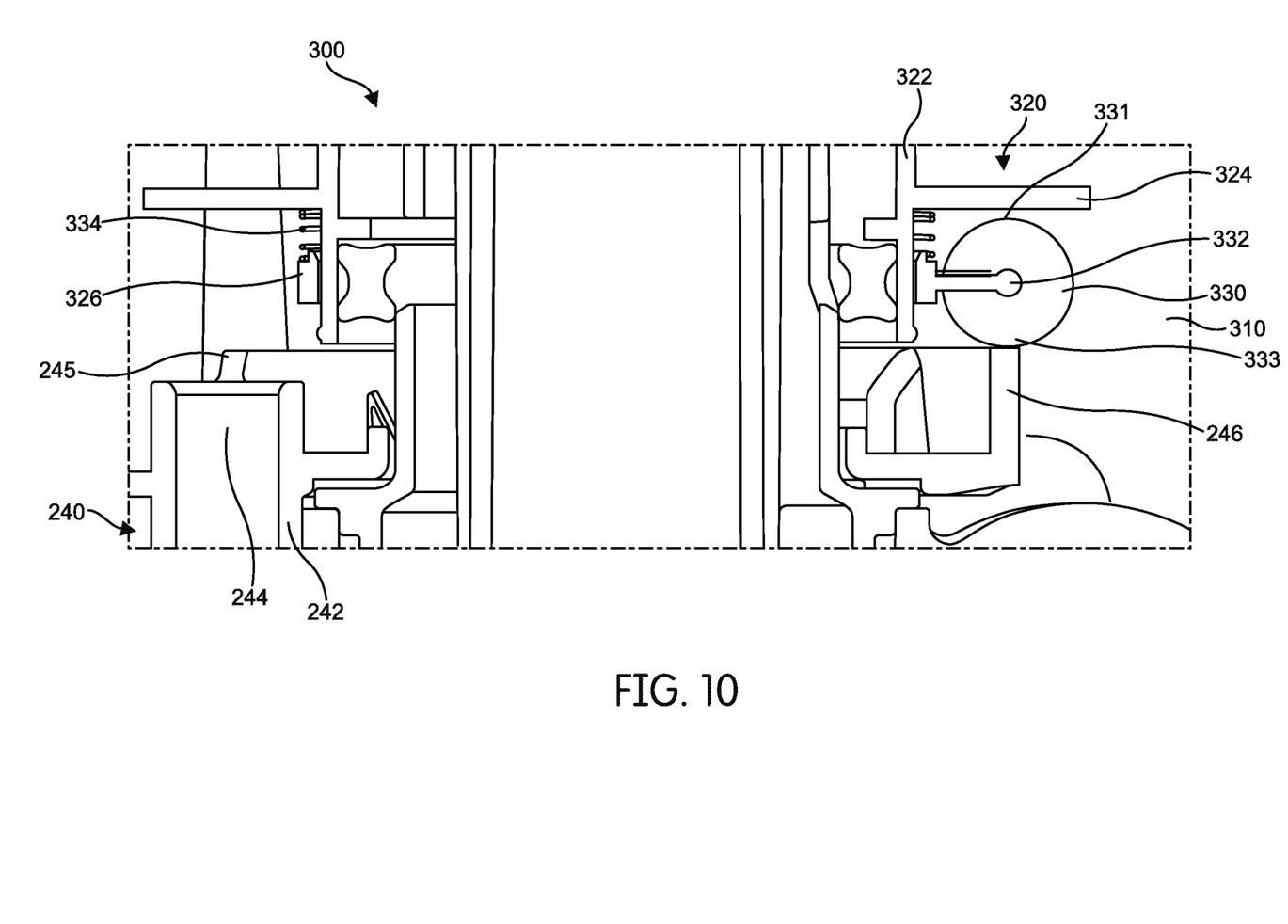
FIG. 10 is a side cross-section view of the filtration apparatus of FIG. 8 in a first configuration after half a rotation of the engagement member.
Figure 11:
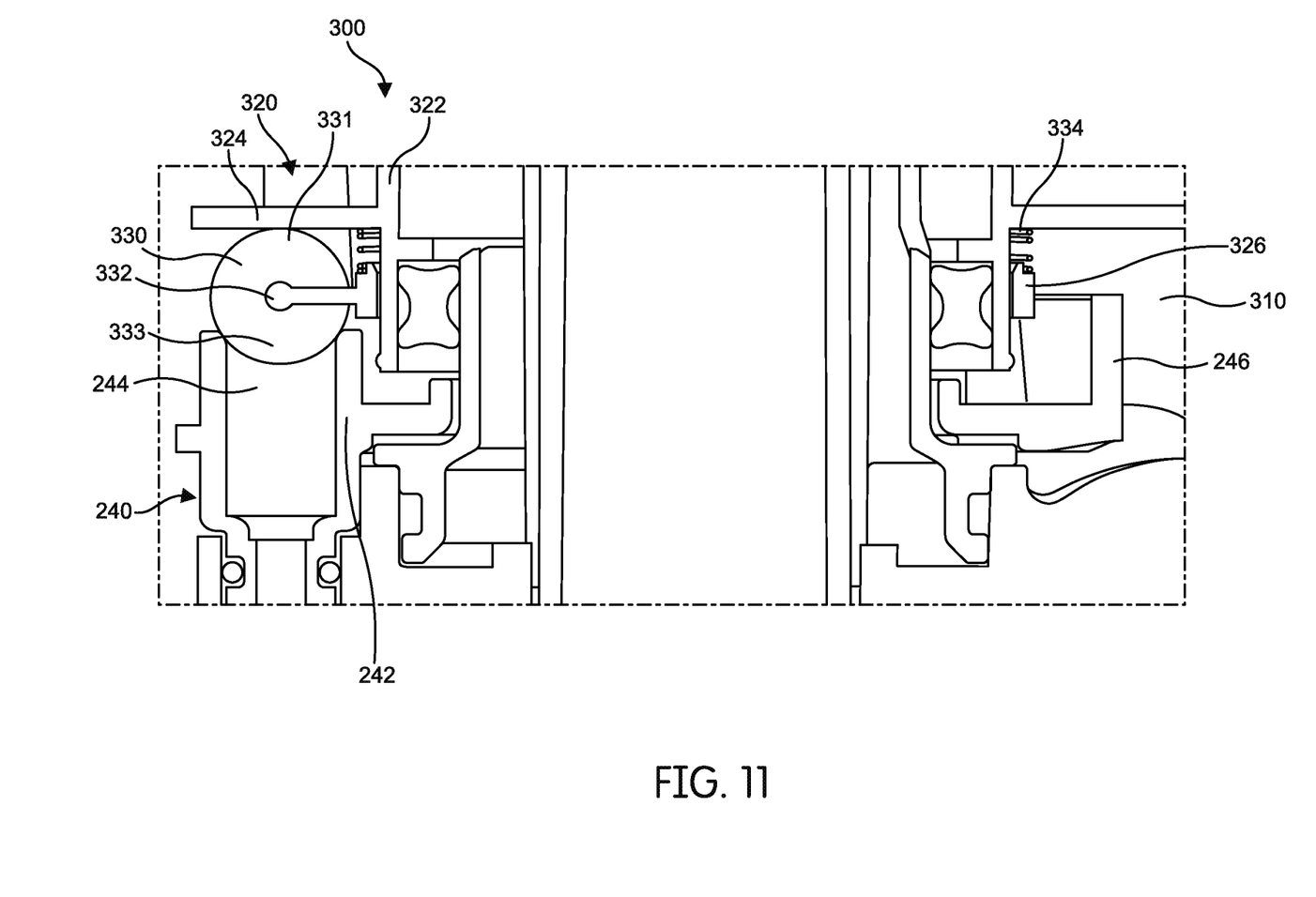
FIG. 11 is a side cross-section view of the filtration apparatus of FIG. 8 in a second configuration.

FIGS. 9-11 show side cross-section views of a filtration apparatus 300 that includes the retention mechanism 320 and the engagement member 240. The filtration apparatus 300 comprises a housing 310 which defines an internal volume sized to receive a filter element. The housing 310 comprises an inlet (not shown) for receiving a fluid (e.g., a diesel fuel) which is communicated after filtering to an IC engine. The housing 310 also includes an outlet (not shown) configured to allow draining of contaminated fluid from the housing 310. The housing 310 can be substantially similar to the housing 110 or 210 and therefore, not described in further detail herein.

FIG. 9 shows the retention mechanism 320 disposed within the housing 310 distal from the engagement member 240. A distance of the retention mechanism 320 from the engagement member 340 is such that the ball plug 330 is aligned with the opening 244 of the port 242 and is suspended over the port 242. A first portion 331 of the ball plug 330 is distal from the protrusion 324 and a second portion 333 of the ball plug 330 is distal from the opening 344 such that the ball plug 330 does not seal the opening 344 of the port 342.

The retention ring 326, and thereby the ball plug 230, is movable relative to the engagement member 240 as described before herein. FIG. 10 shows the ball plug 330 in a first position after half a turn rotation of the retention ring 326 (e.g., due to rotation of the base 322 or a filter disposed in the housing 310 to which the base 322 is coupled) relative to the engagement member 240. In the first position, the first portion 331 of the ball plug 330 is distal from the protrusion 324. The second portion 333 of the ball plug 330 is in contact with the ramp 246 of the engagement member 240 such that the opening 244 of the port 242 is not sealed.

The retention ring 326 can be rotated further (e.g., due to rotation of the base 322 or a filter disposed in the housing 310 to which the base 322 is coupled), for example, 2 turns, 3 turns, etc., to urge the ball plug 330 into a second position shown in FIG. 11. In the second position, the ball plug 330 is aligned with the port 242. The chamfer 245 of the ramp 246 of the engagement member 240 maintains the ball plug 330 proximal to the opening 244, as describe before herein. Moreover, the first portion 331 of the ball plug 330 is in contact with the protrusion 324 of the base 322 which urges the ball plug 330 towards the opening 244 and prevents the ball plug 330 from moving any further relative to the engagement member 240.

The second portion 333 of the ball plug 330 is in contact with the port 242 and seals the opening 244 of the port 242 aided by an axial force exerted by the protrusion 324 on the first portion 331 of the ball plug 330. In this manner, the ball plug 330 can be moved between the first position and the second position to retain the fluid (e.g., diesel fuel) within the housing 310 or drain the fluid from the housing 310.

As used herein, the terms "about" and "approximately" generally mean plus or minus 10% of the stated value. For example, about 0.5 would include 0.45 and 0.55, about 10 would include 9 to 11, about 1000 would include 900 to 1100.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A filtration apparatus comprising:
    a housing defining an internal volume sized to receive a filter element, the housing comprising an inlet for receiving a fluid and an outlet for expelling the fluid;
    a retention mechanism disposed in the housing;
    a ball plug operatively connected to the retention mechanism, the ball plug configured to be selectively displaced in an axial direction relative to the housing; and
    an engagement member disposed within the housing, the engagement member comprising a port having an opening and a ramp, the ramp being elevated with respect to the opening, at least a portion of the port disposed within the outlet of the housing,
    wherein the ball plug is movable between a first position, in which the ball plug rests on the ramp and the ball plug does not seal the opening of the port such that the fluid can be expelled from the outlet of the housing, and a second position, in which the ball plug is aligned with the port and the ball plug seals the opening of the port such that the fluid cannot be expelled from the outlet of the housing, the filtration apparatus being in an operational state in the second position.

2. The filtration apparatus of claim 1, wherein the retention mechanism comprises:
    a cage defining an internal volume within which the ball plug is disposed, the cage having at least one sidewall and a roof, an end of the at least one sidewall proximal to the engagement member defining a protrusion structured to retain the ball plug within the internal volume,
    wherein, in the first position a first portion of the ball plug is distal from the roof and a second portion of the ball plug is in contact with the ramp of the engagement member such that the opening of the port is not sealed, and in the second position the ball plug is aligned with the port, the first portion of the ball plug is in contact with the roof, and the second portion of the ball plug is in contact with the port and seals the opening of the port.

3. The filtration apparatus of claim 1, further comprising a filter positioned within the internal volume defined by the housing, the filter including the filter element.

4. The filtration apparatus of claim 3, wherein the retention mechanism is coupled to the filter and structured to rotate with the filter when the filter is rotated relative to the housing.

5. The filtration apparatus of claim 3, wherein the retention mechanism is fixedly positioned in the housing, and wherein the ball plug is movable about the filter.

6. The filtration apparatus of claim 3, wherein the ramp includes a circular ring shaped member positioned about a periphery of the engagement member, the ramp elevated with respect to the outlet of the housing.

7. The filtration apparatus of claim 6, wherein the ramp defines a chamfer proximal to the outlet of the housing, the chamfer structured to guide the ball plug into the port.

8. A filtration apparatus, comprising:
    a housing defining an internal volume sized to receive a filter element, the housing comprising an inlet for receiving a fluid and an outlet for expelling the fluid;
    a retention mechanism disposed in the housing, the retention mechanism comprising:
        a base having a circular protrusion disposed thereon, and
        a retention ring slidably disposed on the base;
    a ball plug fixedly coupled to the retention ring, the ball plug configured to be selectively displaced in an axial direction relative to the housing; and
    an engagement member disposed within the housing, the engagement member comprising a port having an opening and a ramp, at least a portion of the port disposed within the outlet of the housing,
    wherein the ball plug is movable between a first position in which the ball plug rests on the ramp, a first portion of the ball plug is distal from the protrusion and a second portion of the ball plug is in contact with the ramp of the engagement member such that the opening of the port is not sealed and the fluid can be expelled from the outlet of the housing, and a second position in which the ball plug is aligned with the port, the first portion of the ball plug is in contact with the protrusion of the base, and the second portion of the ball plug is in contact with the port and seals the opening of the port such that the fluid cannot be expelled from the outlet of the housing.

9. The filtration apparatus of claim 8, wherein the retention mechanism further comprises:
a biasing member disposed on the base, the biasing member coupled to the retention ring and configured to bias the retention ring towards the engagement member.

10. The filtration apparatus of claim 1, wherein the fluid to be filtered comprises diesel fuel.

11. An apparatus for allowing selective removal of fluid from a housing sized to receive a filter element, the housing including an inlet for receiving a fluid and an outlet for expelling the fluid, the apparatus comprising:
a cage defining an internal volume, the cage having at least one sidewall and a roof, an end of the at least one sidewall opposite the roof defining a protrusion;
a ball plug positioned within the internal volume of the cage and retained therein by the protrusion, the ball plug configured to be selectively displaced in an axial direction relative to the housing; and
an engagement member positioned within the housing, the engagement member comprising a port having an opening and a ramp, at least a portion of the port positioned within the outlet of the housing,
wherein the ball plug is movable between a first position, in which the ball plug rests on the ramp and the ball plug does not seal the opening of the port such that the fluid can be expelled from the outlet of the housing, and a second position, in which the ball plug is aligned with the port and the ball plug seals the opening of the port such that the fluid cannot be expelled from the outlet of the housing.

12. The apparatus of claim 11, wherein in the first position, a first portion of the ball plug is distal from the protrusion and a second portion of the ball plug is in contact with the ramp of the engagement member such that the opening of the port is not sealed, and in the second position, the ball plug is aligned with the port, the first portion of the ball plug is in contact with the protrusion of the base, and the second portion of the ball plug is in contact with the port and seals the opening of the port.

13. The apparatus of claim 11, further comprising a filter positioned within the housing, the filter including the filter element, and wherein the retention mechanism is coupled to the filter and structured to rotate with the filter when the filter is rotated relative to the housing.

14. The apparatus of claim 11, further comprising a filter positioned within the housing, the filter including the filter element, wherein the retention mechanism is fixedly positioned in the housing, and wherein the ball plug is movable about the filter.

15. The apparatus of claim 11, wherein the ramp includes a circular ring shaped member positioned about a periphery of the engagement member, the ramp elevated with respect to an outlet of the housing.

16. The apparatus of claim 15, wherein the ramp defines a chamfer proximal to the outlet of the housing, the chamfer structured to guide the ball plug into the port.

17. An apparatus for allowing selective removal of fluid from a housing sized to receive a filter element, the housing including an inlet for receiving a fluid and an outlet for expelling the fluid, the apparatus comprising:
a retention mechanism positioned in the housing, the retention mechanism comprising a base having a circular protrusion positioned thereon, and a retention ring slidably disposed on the base;
a ball plug coupled to the retention ring, the ball plug configured to be selectively displaced in an axial direction relative to the housing; and
an engagement member positioned within the housing, the engagement member comprising a port having an opening and a ramp, at least a portion of the port disposed within the outlet of the housing,
wherein the ball plug is movable between a first position, in which the ball plug rests on the ramp and the ball plug does not seal the opening of the port such that the fluid can be expelled from the outlet of the housing, and a second position, in which the ball plug is aligned with the port and the ball plug seals the opening of the port such that the fluid cannot be expelled from the outlet of the housing.

18. The apparatus of claim 17, wherein the retention mechanism further comprises a rod extending orthogonally from the retention ring, the ball plug coupled to an end of the rod located opposite the retention ring.

19. The apparatus of claim 17, wherein in the first position a first portion of the ball plug is distal from the protrusion and a second portion of the ball plug is in contact with the ramp of the engagement member such that the opening of the port is not sealed, and in the second position the ball plug is aligned with the port, the first portion of the ball plug is in contact with the protrusion of the base, and the second portion of the ball plug is in contact with the port and seals the opening of the port.

20. The apparatus of claim 17, wherein the retention mechanism further comprises:
a biasing member positioned on the base, the biasing member coupled to the retention ring and configured to bias the retention ring towards the engagement member.

21. The apparatus of claim 17, wherein the ramp includes a circular ring shaped member positioned about a periphery of the engagement member, the ramp elevated with respect to an outlet of the housing.

22. The apparatus of claim 21, wherein the ramp defines a chamfer proximal to the outlet of the housing, the chamfer structured to guide the ball plug into the port.

* * * * *